Sept. 6, 1949.   C. H. DEDERICK   2,481,402
MOTOR BRAKE
Filed May 12, 1944
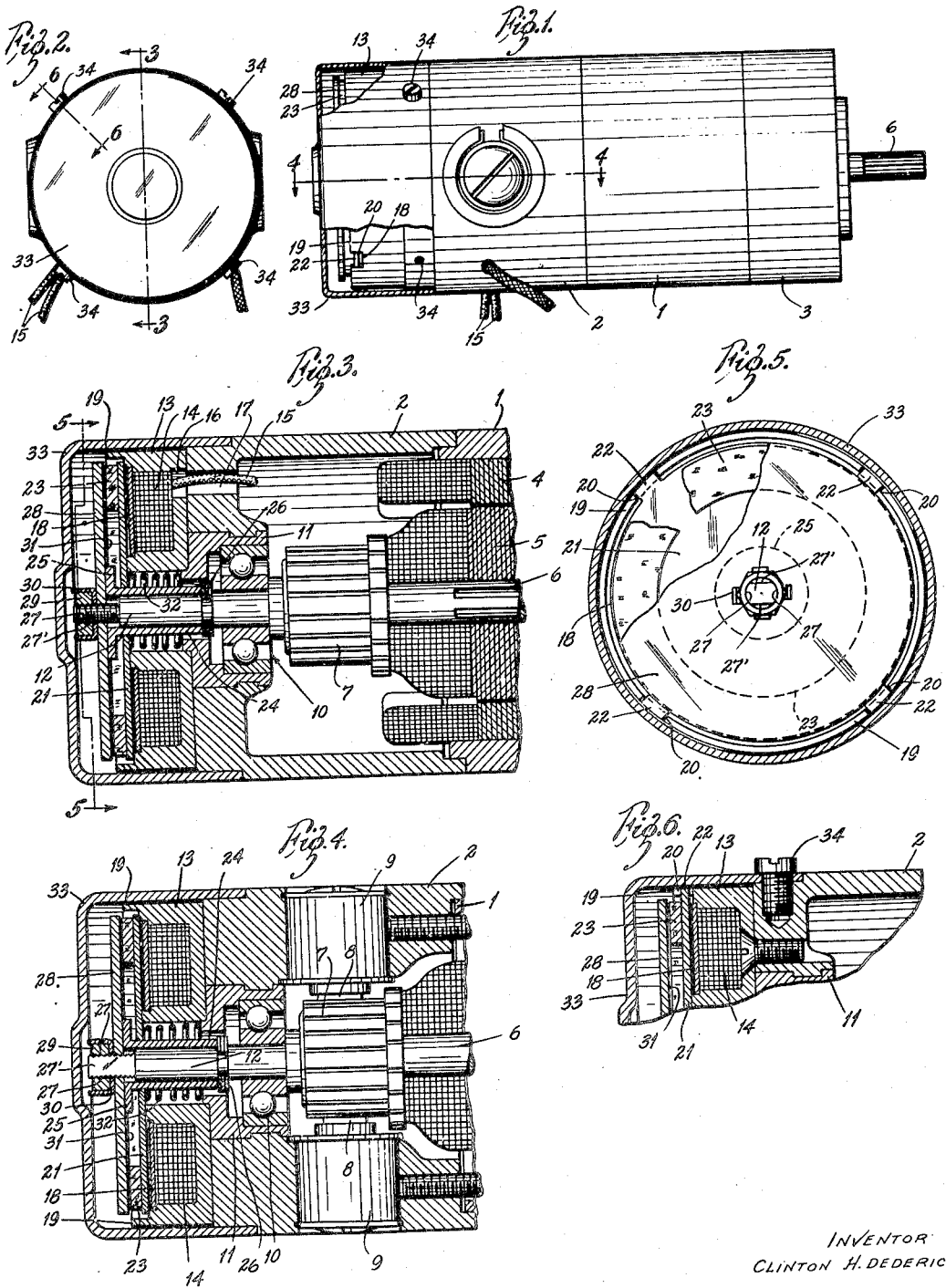
INVENTOR
CLINTON H. DEDERICK,
ATTORNEYS Patented Sept. 6, 1949

2,481,402

UNITED STATES PATENT OFFICE 2,481,402

MOTOR BRAKE

Clinton H. Dederick, Brentwood, Mo., assignor to The Emerson Electric Manufacturing Company, St. Louis, Mo., a corporation of Missouri Application May 12, 1944, Serial No. 535,256

4 Claims. (Cl. 188—171)

1

This invention relates to brakes, and more particularly to an improved brake for use with electric motors.

One of the objects of the invention is to provide an improved brake for use with an electric motor which will be automatically applied when the motor is deenergized and automatically released when the motor is energized for starting.

Another object is to produce an improved spring-applied and electro-magnetically released brake.

A further object is to produce an improved brake for use with an electric motor rotor shaft which will be efficient in operation, compact in construction, and so arranged as to be enclosed in a separate compartment, yet readily accessible for service and repair.

Other objects of my invention will become apparent from the following description taken in connection with the accompanying drawings in which:

Fig. 1 is a side view of an electric motor and brake assembly embodying the invention, parts being broken away;

Fig. 2 is an end view of the assembly;

Figs. 3 and 4 are longitudinal sectional views taken, respectively, on the lines 3—3 of Fig. 2 and 4—4 of Fig. 1;

Fig. 5 is a sectional view taken on the line 5—5 of Fig. 3 with one brake disc and the brake lining broken away; and Fig. 6 is a sectional view taken on the line 6—6 of Fig. 2.

Referring to the drawings in detail, Fig. 1 discloses the motor and brake embodied as an assembly, said motor being of usual construction comprising a housing 1 having end members 2 and 3. The housing 1 carries the field windings 4 of the motor surrounding the armature 5 which is mounted upon a shaft 6 having its ends journaled in the end members 2 and 3. The motor shown is of the D. C. type with an armature provided with a commutator 7 engaged by brushes 8 mounted in the end member 2 by means of brush holders 9.

As shown best in Figs. 3 and 4, the commutator end of the motor shaft is journaled in the end member 2 by means of a bearing 10 and a bearing holder 11. This end of the shaft extends outwardly beyond the bearing and the end member, said extending portion being indicated by the numeral 12. In surrounding relation to this extending shaft portion 12 and secured to the outer end surface of the end member 2 is an annular magnet housing 13 of U-shaped radial cross

2 section. The open end of this housing faces outwardly and positioned in the housing is a magnet coil 14, the terminal conductors 15 thereof extending through an opening 16 in the housing and an opening 17 in the end member. One of these terminal conductors may be connected to one of the brushes of the motor and the other terminal to the source of current, thus placing the magnet coil in series with the field and armature of the motor. If found desirable, the terminal conductors may be connected to both brush terminals, thus placing the magnet in parallel with the field and armature of the motor. The coil is held in the housing by a non-magnetic retainer 18.

The peripheral wall of the housing 13 extends beyond the coil as indicated at 19, and this extension is provided with a plurality of circumferentially spaced notches 20. A steel disc 21 is positioned adjacent the coil and within the extension of the housing, said disc forming the movable element of the brake and, when acted upon by magnetic force, is pulled against shoulder means provided by the housing. This disc is provided with peripheral ears 22 which are received in the slots 20 to thus hold the disc against rotation relative to the magnet housing and also the end member of the motor. The ears and slots, however, permit axial movement of the disc and form contact points between the disc 21 and the magnetic housing for providing a closed magnetic circuit between these members. On the forward face of the disc is an annular brake lining 23 which is made from suitable friction material such as, for example, cork.

The portion 12 of the motor shaft 6 extends through and beyond the magnet housing and the disc 21, and carried on this portion of the shaft is a spacer sleeve 24 having a flange 25 on its outer end. The inner end of this spacer sleeve is adapted to abut against a group of thin washers 26 carried by the shaft just outwardly of the bearing. The extreme outer end of the shaft is reduced in diameter and provided with threads 26 and opposed flats 27. A second disc 28 is mounted on this reduced end of the shaft for rotation with the shaft, said disc having a general rectangular opening for cooperating with the flats and being clamped against the flange of the sleeve by a nut 29, which nut is prevented from turning by a locking washer 30. The outer surface of the sleeve flange is normal to the axis of the shaft in order that the disc will run true when clamped to the shaft. The washers 26 at the inner end of the sleeve permit adjustment of the disc 28 on the shaft and consequently the clearance between the disc 28 and the lining 23 when the brake is released.

The inner surface 31 of the disc 28, which lies adjacent the lining 23 carried by the disc 21, is lapped, thus providing a very smooth surface for engagement by the lining, this engagement being brought about by an axial movement of the disc 21 under the action of a coil spring 32 which surrounds the spacer sleeve and is positioned between the disc 21 and the bearing holder 11.

In order that the brake assembly which is mounted exterior to the end member 2 may be totally enclosed so as to exclude the dust, dirt and any other foreign material, there is provided a cup-shaped closure cap 33 which telescopes on to the end member and is held thereto by screws 34.

Operation

When the motor is not operating, the magnet will not be energized due to the fact that the coil is in the open motor circuit. Consequently, there will be no magnetic force acting upon the disc 21 to maintain the lining disengaged from the disc 28 and, therefore, the spring 32 will be effective to cause the lining to frictionally engage the lapped surface 31 of the disc 28 and cause the brake to be applied. When the motor is started, the coil of the magnet will be energized thereby, producing a magnetic force which will pull the disc 21 away from the disc 28 and against the brake applying action of the spring 32, thereby releasing the brake. With the brake released, the motor, of course, will operate in its usual manner. As soon as the current is cut off to stop the motor, the magnet will be deenergized, and consequently the brake will again be applied under the action of the coil spring 32.

From the foregoing description, it will be obvious that the improved brake is very compact in construction and is readily associated with the motor shaft and one end member of the motor. All the parts of the brake are readily accessible by merely removing the cover cap 33. If it is desired to inspect or replace the lining or service the magnet, this can be easily accomplished by merely removing the disc 28 which is held to the rotor shaft by a single nut. By providing the rotating disc 28 with a lapped surface, the reliability of the brake is considerably increased. When the motor is traveling at a very high rate of speed, and the current is cut, the shaft of the motor will be stopped within a very few revolutions.

What is claimed is:

1. A braking mechanism for an electric motor comprising a shaft, said shaft being adapted to be secured to the rotor shaft of a motor to rotate therewith, a stationary annular housing mounted about said shaft, said housing being of U shape in radial cross section, energizable electro-magnetic coils within the annular housing, an adjustable abutment on the shaft, a sleeve disposed about the shaft and at one end abutting said abutment, said sleeve having an annular flange at the other end, said sleeve being concentric with said housing, an outer disc secured to the shaft at the end remote from said abutment and secured to the flange of the sleeve, said disc being adapted to rotate with said shaft, a second disc disposed about said shaft inwardly of the sleeve flange and facing the open side of and connected to the said housing for axial movement only in respect to said housing and said shaft, said second disc having friction material on the side facing said outer disc, a compression spring disposed about the sleeve, said spring abutting said second disc and constantly biasing said second disc towards said outer disc to engage said friction material therewith, means maintaining said elements in assembled relation, and a casing enclosing said elements, said electro-magnetic coils when energized being adapted to move said second disc away from said outer disc to engage the friction material therewith adapted to force said second disc towards said outer disc to engage the friction material therewith when said electro-magnetic coils are deenergized.

2. A braking mechanism for an electric motor comprising a shaft, said shaft being adapted to be secured to the rotor shaft of a motor to rotate therewith, a stationary annular housing mounted about said shaft, said housing being of U shape in radial cross section, energizable electro-magnetic coils within the annular housing, an adjustable abutment on the shaft, a sleeve disposed about the shaft and at one end abutting said abutment, said sleeve having an annular flange at the other end, said sleeve being concentric with said housing, an outer disc secured to the shaft at the end remote from said abutment and secured to the flange of the sleeve, said disc being adapted to rotate with said shaft, a second disc disposed about said shaft inwardly of the sleeve flange and facing the open side of and connected to the said housing for axial movement only in respect to said housing and said shaft, said connecting means comprising peripheral ears on the said second disc and slots in the outer wall of the housing providing a closed magnetic circuit, said second disc having friction material on the side facing said outer disc, a compression spring disposed about the sleeve, said spring abutting said second disc and constantly biasing said second disc towards said outer disc to engage said friction material therewith, means maintaining said elements in assembled relation, and a casing enclosing said elements, said electromagnetic coils when energized being adapted to move said second disc away from said outer disc against said spring, said spring being adapted to force said second disc towards said outer disc to engage the friction material therewith when said electro-magnetic coils are deenergized.

3. A braking mechanism for an electric motor comprising a shaft, said shaft being adapted to be secured to the rotor shaft of a motor to rotate therewith, a stationary annular housing mounted about said shaft, said housing being of U shape in radial cross section, energizable electro-magnetic coils within the annular housing, an adjustable abutment on the shaft, said adjustable abutment comprising a plurality of shim washers adapted to be selectively removed to compensate for wear in the braking mechanism, a sleeve disposed about the shaft and at one end abutting the washers, said sleeve having an annular flange at the other end, said sleeve being concentric with said housing, an outer disc secured to the shaft at the end remote from the washers and secured to the flange of the sleeve, said disc being adapted to rotate with said shaft, a second disc disposed about said shaft inwardly of the sleeve flange and facing the open side of and connected to the said housing for axial movement only in respect to said housing and said shaft, said second disc having friction material on the side facing said outer disc, a compression spring disposed about the sleeve, said spring abutting said second disc and constantly biasing said second disc towards said outer disc to engage said friction material therewith, means maintaining said elements in assembled relation, and a casing enclosing said elements, said electro-magnetic coils when energized being adapted to move said second disc away from said outer disc against said spring, said spring being adapted to force said second disc towards said outer disc to engage the friction material therewith when said electro-magnetic coils are deenergized.

4. A braking mechanism for an electric motor comprising a shaft, said shaft being adapted to be secured to the rotor shaft of a motor to rotate therewith, a stationary annular housing mounted about said shaft, said housing being of U-shape in radial cross section, energizable electro-magnetic coils within the annular housing, an adjustable abutment on the shaft, said adjustable abutment comprising a plurality of shim washers adapted to be selectively removed to compensate for wear in the braking mechanism, a sleeve disposed about the shaft and at one end abutting the washers, said sleeve having an annular flange at the other end, said sleeve being concentric with said housing, an outer disc secured to the shaft at the end remote from the washers and secured to the flange of the sleeve, said disc being adapted to rotate with said shaft, a second disc disposed about said shaft inwardly of the sleeve flange and facing the open side of and connected to the coil housing for axial movement only in respect to said housing and said shaft, said connecting means comprising peripheral ears on the said second disc and slots in the outer wall of the housing providing a closed magnetic circuit, said second disc having friction material on the side facing said outer disc, a compression spring disposed about the sleeve, said spring abutting said second disc and constantly biasing said second disc towards said outer disc to engage said friction material therewith, means maintaining said elements in assembled relation, and a casing enclosing said elements, said electro-magnetic coils when energized being adapted to move said second disc away from said outer disc against said spring, said spring being adapted to force said second disc towards said outer disc to engage the friction material therewith when said electro-magnetic coils are deenergized.

CLINTON H. DEDERICK.

REFERENCES CITED

The following references are of record in the file of this patent:

UNITED STATES PATENTS

| Number | Name | Date |
| --- | --- | --- |
| 736,461 | Thresher | Aug. 18, 1903 |
| 1,060,966 | Balcome | May 6, 1913 |
| 1,725,968 | Remde | Aug. 27, 1929 |
| 1,852,574 | Howe | Apr. 5, 1932 |
| 2,180,751 | Wagner | Nov. 21, 1939 |
| 2,410,630 | Chilman | Nov. 5, 1946 |